United States Patent
Okubo et al.

(10) Patent No.: US 10,323,717 B2
(45) Date of Patent: *Jun. 18, 2019

(54) FRICTION TRANSMISSION BELT

(71) Applicant: BANDO CHEMICAL INDUSTRIES, LTD., Kobe-shi, Hyogo (JP)

(72) Inventors: Takayuki Okubo, Kobe (JP); Shinji Takahashi, Kobe (JP); Hideaki Kawahara, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,832

(22) Filed: Aug. 30, 2018

(65) Prior Publication Data

US 2018/0372183 A1 Dec. 27, 2018

Related U.S. Application Data

(63) Continuation of application No. PCT/JP2017/000153, filed on Jan. 5, 2017.

(30) Foreign Application Priority Data

Mar. 28, 2016 (JP) .................................. 2016-064485

(51) Int. Cl.

| F16G 1/00 | (2006.01) |
|---|---|
| C08K 3/00 | (2018.01) |
| C08L 21/00 | (2006.01) |
| C08L 23/06 | (2006.01) |
| C08L 67/02 | (2006.01) |
| C08L 101/12 | (2006.01) |
| F16G 5/00 | (2006.01) |
| F16G 5/06 | (2006.01) |
| F16G 5/20 | (2006.01) |
| F16G 1/28 | (2006.01) |
| F16G 1/10 | (2006.01) |

(52) U.S. Cl.
CPC .................. *F16G 1/28* (2013.01); *C08K 3/00* (2013.01); *C08L 21/00* (2013.01); *C08L 23/06* (2013.01); *C08L 67/02* (2013.01); *C08L 101/12* (2013.01); *F16G 1/00* (2013.01); *F16G 1/10* (2013.01); *F16G 5/00* (2013.01); *F16G 5/06* (2013.01); *F16G 5/20* (2013.01)

(58) Field of Classification Search
CPC ..... F16G 1/28; F16G 1/10; F16G 1/06; F16G 1/08; F16G 5/06; F16G 5/20; F16G 5/00; F16G 5/04
See application file for complete search history.

(56) References Cited

U.S. PATENT DOCUMENTS

| 2002/0055558 | A1 | 5/2002 | Maehara et al. | |
|---|---|---|---|---|
| 2004/0214676 | A1* | 10/2004 | Shiriike | .................... F16G 5/06 474/260 |
| 2005/0154132 | A1 | 7/2005 | Hakuta et al. | |
| 2009/0298632 | A1* | 12/2009 | Shiriike | .................... F16G 1/10 474/263 |
| 2012/0058849 | A1 | 3/2012 | Yoshida | |
| 2013/0085028 | A1* | 4/2013 | Yamada | .................... F16G 5/08 474/263 |
| 2013/0109800 | A1 | 5/2013 | Weber | |
| 2013/0237354 | A1 | 9/2013 | Shiriike | |
| 2014/0103562 | A1 | 4/2014 | Okubo et al. | |
| 2014/0364260 | A1 | 12/2014 | Takahashi et al. | |
| 2016/0298725 | A1 | 10/2016 | Ishiguro et al. | |

FOREIGN PATENT DOCUMENTS

| DE | 112010003337 T5 | 7/2012 |
|---|---|---|
| JP | H11-228941 A | 8/1999 |
| JP | 2001-031809 A | 2/2001 |
| JP | 2007-070592 A | 3/2007 |
| JP | 2007-170454 A | 7/2007 |
| JP | 2007-270917 A | 10/2007 |
| JP | 2007-298162 A | 11/2007 |
| JP | 2013-536268 A | 9/2013 |
| JP | 2014-185076 A | 10/2014 |
| JP | 2014-209026 A | 11/2014 |
| WO | 2011/158586 A | 12/2011 |
| WO | 2012/053176 A | 4/2012 |
| WO | 2012/172717 A | 12/2012 |
| WO | 2013/124943 A1 | 8/2013 |

* cited by examiner

*Primary Examiner* — Christopher M Rodd
(74) *Attorney, Agent, or Firm* — Maschoff Brennan

(57) ABSTRACT

In a friction transmission belt including a rubber layer forming a pulley contact surface, the rubber layer includes a rubber composition containing hydrophilic inorganic filler and a sliding-resistant material. The sliding-resistant material protrudes from the pulley contact surface, and is at least one of hydrophobic resin particles and hydrophobic resin fibers having an official regain of 0.4% or below, and in the rubber composition, a content of the hydrophilic inorganic filler with respect to 100 parts by mass of the rubber component is 35 parts by mass or more.

8 Claims, 15 Drawing Sheets

FRICTION TRANSMISSION BELT

CROSS-REFERENCE TO RELATED APPLICATIONS

This is a continuation of International Application No. PCT/JP2017/000153 filed on Jan. 5, 2017, which claims priority to Japanese Patent Application No. 2016-064485 filed on Mar. 28, 2016. The entire disclosures of these applications are incorporated by reference herein.

BACKGROUND

The present disclosure relates to a friction transmission belt.

Friction transmission belts known in the art have a pulley contact surface from which polymer particles and short fibers are exposed.

For example, Japanese Unexamined Patent Publication No. 2007-070592 discloses a V-ribbed belt including a compressed rubber layer (i) made of a rubber composition containing ultrahigh molecular weight polyethylene particles, and (ii) further including short fibers. Japanese Unexamined Patent Publication No. 2007-170454 discloses a V-ribbed belt including a rib surface layer (i) made of a rubber composition containing high molecular weight polyethylene particles, and (ii) filled with short fibers.

The present disclosure is intended to reduce abnormal noise of a friction transmission belt when the belt is wet.

SUMMARY

The present disclosure is directed to a friction transmission belt including a rubber layer forming a pulley contact surface, the rubber layer includes a rubber composition containing hydrophilic inorganic filler and a sliding-resistant material. The sliding-resistant material protrudes from the pulley contact surface, and is at least one of hydrophobic resin particles and hydrophobic resin fibers having an official regain of 0.4% or below, and in the rubber composition, a content of the hydrophilic inorganic filler with respect to 100 parts by mass of the rubber component is 35 parts by mass or more.

A friction transmission belt of the present disclosure includes a rubber layer acting as a pulley contact surface and made of a rubber composition containing a hydrophilic inorganic filler and a sliding-resistant material which is at least one of hydrophobic resin particles and hydrophobic resin fibers. Such a feature can reduce abnormal noise when the belt is wet.

DETAILED DESCRIPTION

Embodiments will be described in detail below, based on the drawings.

First Embodiment

Figure 1:
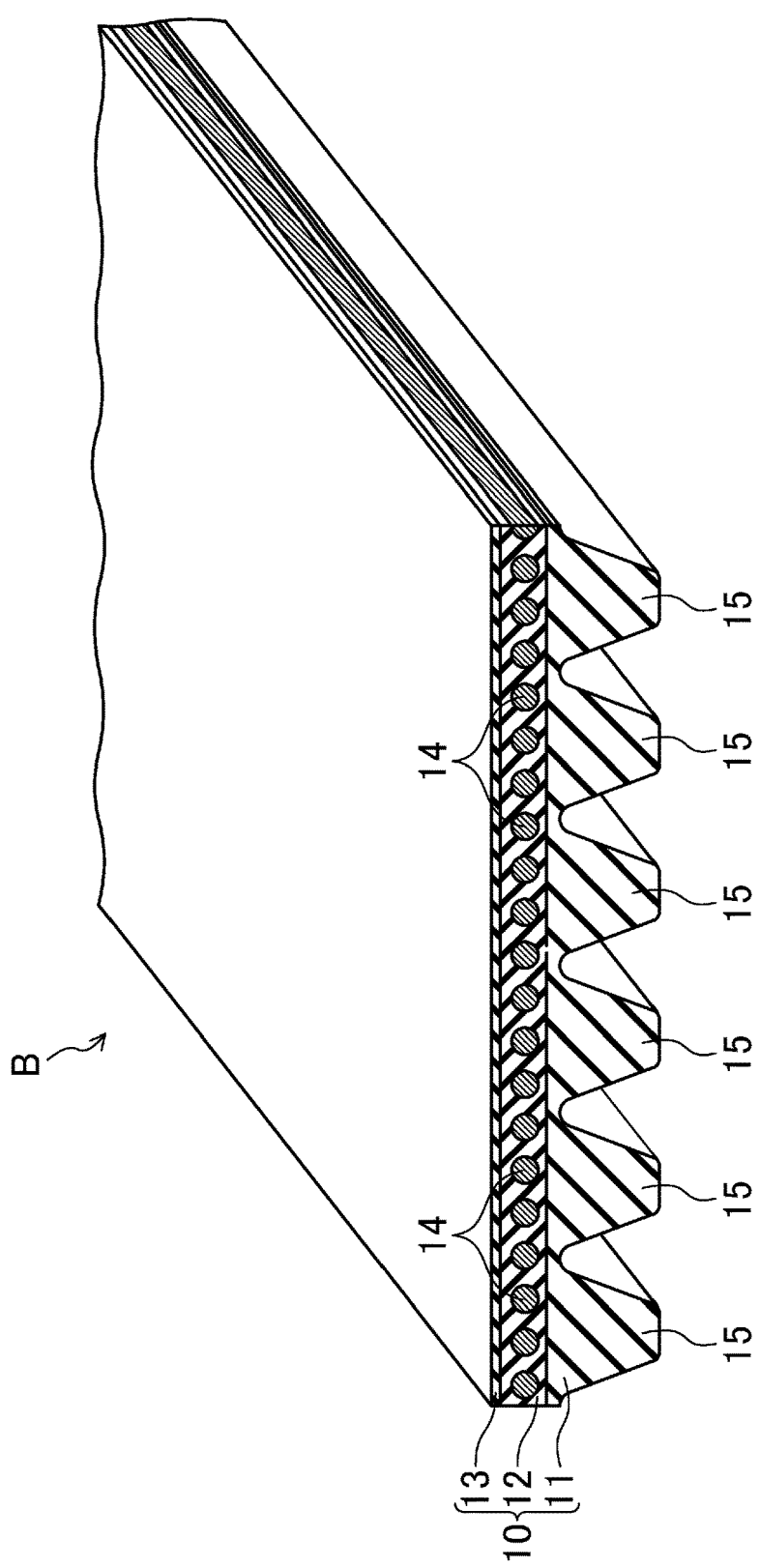
FIG. 1 illustrates a perspective view of a V-ribbed belt according to a first embodiment.
Figure 2:
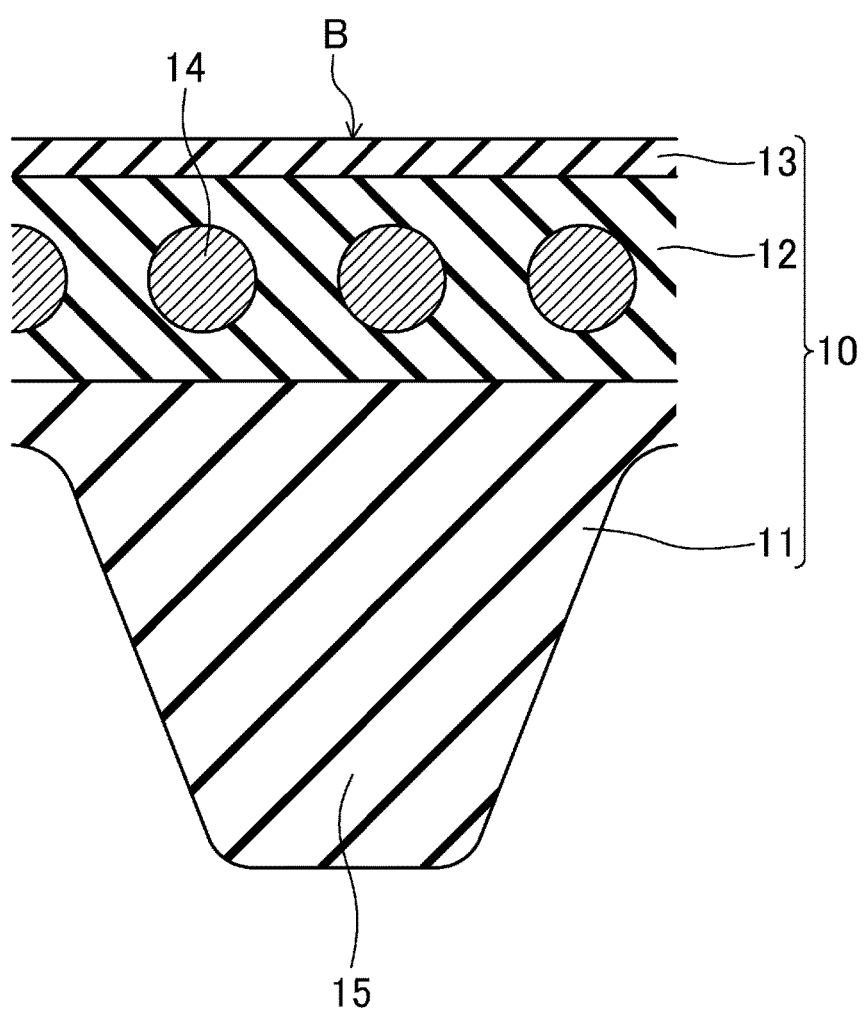
FIG. 2 illustrates a cross-sectional view of a single V-shaped rib of the V-ribbed belt according to the first embodiment.

FIGS. 1 and 2 illustrate a V-ribbed belt B (a friction transmission belt) according to a first embodiment. The V-ribbed belt B of the first embodiment is, for example, an endless belt used in a belt transmission system for driving an accessory provided in an engine compartment of an automobile. The V-ribbed belt B of the first embodiment has a length of 700 mm to 3000 mm, a width of 10 mm to 36 mm, and a thickness of 4.0 mm to 5.0 mm, for example.

The V-ribbed belt B of the first embodiment has a three-layered V-ribbed belt body 10 which includes a compressed rubber layer 11 constituting an inner surface portion of the belt, an adhesive rubber layer 12 constituting an intermediate portion of the belt, and a stretch rubber layer 13 constituting an outer surface portion of the belt. A cord 14 is embedded in a middle portion, in the belt thickness direction, of the adhesive rubber layer 12 of the V-ribbed belt body 10, such that the cord 14 forms a helical pattern having a pitch in the belt width direction. The compressed rubber layer 11 has a thickness of 1.0 mm to 3.6 mm, for example. The adhesive rubber layer 12 has a thickness of 1.0 mm to 2.5 mm, for example. The stretch rubber layer 13 has a thickness of 0.4 mm to 0.8 mm, for example. The stretch rubber layer 13 may be replaced with a backface reinforcing fabric.

The compressed rubber layer 11 includes a plurality of V-shaped ribs 15 protruding from the inner surface portion of the belt. The plurality of V-shaped ribs 15 are each formed in the shape of a ridge extending in the longitudinal direction of the belt and having an approximately inverted triangular cross-section. The V-shaped ribs 15 are arranged parallel to one another in the width direction of the belt. The surfaces of the V-shaped ribs 15 included in the compressed rubber layer 11 constitute a pulley contact surface acting as a power transmission face. Each of the V-shaped ribs 15 has, for example, a height of 2.0 mm to 3.0 mm, and a width of 1.0 mm to 3.6 mm at a proximal end. The number of the V-shaped ribs is 3 to 6 (6 ribs in FIG. 1), for example.

The compressed rubber layer 11 is made of a rubber composition produced from an uncrosslinked rubber composition prepared by kneading a rubber component with various compound ingredients including a hydrophilic inorganic filler and a sliding-resistant material. This uncrosslinked rubber composition is heated and pressed, so that the rubber component is crosslinked. The obtained rubber composition is used for the compressed rubber layer 11. Thus, the rubber composition forming the compressed rubber layer 11 contains the crosslinked rubber component and various compound ingredients, including the hydrophilic inorganic filler and the sliding-resistant material, which are dispersed in the rubber component. The V-ribbed belt B according to the first embodiment can reduce abnormal noise in a wet condition as shown in Examples, which will be described later, because the compressed rubber layer 11 forming the pulley contact surface is made of the rubber composition containing the hydrophilic inorganic filler and the sliding-resistant material, and the sliding-resistant material is dispersed in and exposed from the pulley contact surface. Here, the sliding-resistant material is at least one of the hydrophobic resin particles and the hydrophobic resin fibers, and has an official regain of 0.4% or below. Moreover, a total content of the hydrophilic inorganic filler with respect to 100 parts by mass of the rubber component is suitably 35 parts by mass or more, more suitably 45 parts by mass or more, and still more suitably 55 parts by mass or more.

Examples of the rubber component of the rubber composition which forms the compressed rubber layer 11 include: an ethylene-α-olefin elastomer, such as an ethylene-propylene-diene terpolymer (hereinafter referred to as "EPDM"), ethylene-propylene copolymer (EPM), ethylene-butene copolymer (EDM), and ethylene-octene copolymer (EOM); chloroprene rubber (CR); chlorosulfonated polyethylene rubber (CSM); and hydrogenated acrylonitrile rubber (H-NBR). One or a blend of two or more of these substances is suitable as the rubber component. The rubber component is suitably ethylene-α-olefin elastomer, and more suitably the EPDM.

The sliding-resistant material blended with the rubber composition is hydrophobic particles and/or resin fibers. Examples of such a sliding-resistant material include polyolefin and polyester. Examples of the polyolefin include homopolymers such as polyethylene, polypropylene, poly-1-butene, and poly-4-methyl-1-pentene; and copolymers of ethylene and α-olefin, such as propylene, 1-butene, 1-hexene, 1-octene, and 4-methyl-1-pentene. As the sliding-resistant material, it is suitable to use one or two kinds of these substances, and more suitably to use particles or fibers of homopolymer of polyethylene. Examples of polyester include polyethylene terephthalate, polytrimethylene-terephthalate, polybutylene terephthalate, polyethylene naphthalate, and polybutylene naphthalate. As the sliding-resistant material, it is suitable to use one or two kinds of these substances, and more suitably to use particles or fibers of polyethylene-terephthalate.

Note that in the present disclosure, resin fibers having an official regain designated by JIS L0105 of 0.4% or below are to be the hydrophobic resin fibers. Particles made of this resin are to be the hydrophobic resin particles. Note that particles and fibers of the present disclosure are not limited to such particles and fibers.

A content of the hydrophobic resin particles with respect to 100 parts by mass of the rubber component is suitably 50 parts by mass or more, more suitably 70 parts by mass or more, and still more suitably 80 parts by mass or more.

Moreover, a content of the hydrophobic resin fibers with respect to 100 parts by mass of the rubber component is suitably 10 parts by mass or more, and more suitably 20 parts by mass or more.

In order to increase the wear resistance of the compressed rubber layer 11 forming the pulley contact surface and to reduce abnormal noise when the V-ribbed belt B is wet, the hydrophobic resin particles suitably contain ultrahigh molecular weight hydrophobic resin particles having an average molecular weight (i.e., weight average molecular weight, number average molecular weight) of 500,000 or more, more suitably 1,000,000 or more, and still more suitably 1,500,000 or more. In order to enhance the flex fatigue resistance, the ultrahigh molecular weight hydrophobic resin particles have an average molecular weight of 6,000,000 or less.

In order to increase the wear resistance of the compressed rubber layer 11 forming the pulley contact surface and to reduce abnormal noise when the V-ribbed belt B is wet, the average particle diameter of the hydrophobic resin particles is suitably 10 μm or larger and more suitably 100 μm or larger, and in order to increase the flex fatigue resistance, suitably 200 μm or smaller, more suitably 170 μm or smaller, and still more suitably 150 μm or smaller. The average particle diameter is obtained by the arithmetic average of the diameters (i.e., the maximum outer diameters) of 50 to 100 particles, both inclusive, actually measured from an observation picture of the polyolefin particles taken by a scanning electron microscope in consideration of a magnification.

In order to increase the wear resistance of the compressed rubber layer 11 forming the pulley contact surface and to reduce the abnormal noise when V-ribbed belt B is wet, the particle size distribution of the hydrophobic resin particles is such that suitably 70% by mass or more, more suitably 80% by mass or more, and still more suitably 90% by mass or more of the polyethylene particles is in the particle diameter range of from 100 μm to 150 μm, both inclusive.

Because of the same reason as that explained for the content of the above hydrophobic resin particles, the hydrophobic resin fibers have a diameter of suitably 1 μm or larger, more suitably 5 μm or larger, and still more suitably 10 μm or larger. The hydrophobic resin fibers have a diameter of suitably 100 μm or smaller, more suitably 70 μm or smaller, and still more suitably 50 μm or smaller.

Next, examples of the inorganic filler contained in the rubber composition include silica, layered silicate, calcium carbonate, and clay. Suitably, the inorganic filler is comprised of one kind or two or more kinds of these substances. The total content of the polyolefin particles and the inorganic filler contained in the rubber composition is suitably in a predetermined amount or more. In addition, a content of the inorganic filler alone is also suitably in a predetermined amount or more. For example, the content of the inorganic filler with respect to 100 parts by mass of the rubber component is suitably 30 parts by mass or more.

Examples of the layered silicate as the inorganic filler include smectite family, vermiculite family, and kaolin family. Examples of the smectite family include montmorillonite, beidellite, saponite, and hectorite. Examples of the vermiculite family include trioctahedral vermiculite and dioctahedral vermiculite. Examples of the kaolin family include kaolinite, dickite, halloysite, lizardite, amesite, and chrysotile. Suitably, the layered silicate is comprised of one kind or two or more kinds of these substances. Montmorillonite is more suitable as the layered silicate.

Suitably, an example of silica included in the inorganic filler does not receive coupling treatment. Furthermore, 30 parts by mass or more, and more suitably 40 parts by mass or more, of silica is suitably contained in the rubber composition with respect to 100 parts by mass of the rubber component.

Examples of other compound ingredients contained in the rubber composition include carbon black, a processing aid, a vulcanization aid, a crosslinking agent, and a co-crosslinking agent.

Examples of carbon blacks include: channel black; furnace black such as SAF, ISAF, N-339, HAF, N-351, MAF, FEF, SRF, GPF, ECF, and N-234; thermal black such as FT and MT; and acetylene black. In this embodiment, the content of the carbon black, which is contained mainly to color the rubber composition black, is suitably smaller than in a case where the carbon black is to be contained to act as a reinforcing material. For example, the content of the carbon black with respect to 100 parts by mass of the rubber component may be 15 parts by mass or less, 10 parts by mass or less, and 5 parts by mass or less.

Examples of the processing aid include a stearic acid, polyethylene wax, and a metal salt of fatty acid. Suitably, the processing aid is comprised of one kind or two or more kinds of these substances. The content of the processing aid in the rubber composition forming the compressed rubber layer 11 with respect to 100 parts by mass of the rubber component is suitably from 0.1 parts by mass to 3 parts by mass.

Examples of the vulcanization aid include metal oxides such as zinc oxide (zinc white) and magnesium oxide. Suitably, the vulcanization aid is comprised of one kind or two or more kinds of these substances. The content of the vulcanization aid with respect to 100 parts by mass of the rubber component is 1 part by mass to 10 parts by mass, for example.

Examples of the crosslinking agent include an organic peroxide and sulfur. The organic peroxide alone, sulfur alone, or even a combination of these substances may be used as the crosslinking agent. The content of crosslinking agent with respect to 100 parts by mass of the component is 0.5 parts by mass to 8 parts by mass when the crosslinking agent is organic peroxide. The content of crosslinking agent with respect to 100 parts by mass of the component is 0.5 parts by mass to 4 parts by mass when the crosslinking agent is sulfur.

Examples of the co-crosslinking agent include trimethylolpropane trimethacrylate, ethylene glycol dimethacrylate, triallyl isocyanurate, liquid polybutadiene, and N, N'-m-phenylenebismaleimide. Suitably, the co-crosslinking agent is comprised of one kind or two or more kinds of these substances. The content of the co-crosslinking agent in the rubber composition forming the compressed rubber layer 11 with respect to 100 parts by mass of the rubber component is suitably 0.5 parts by mass to 7 parts by mass.

The adhesive rubber layer 12 is in the shape of a strip having a horizontally elongated rectangular cross-section. The stretch rubber layer 13 is also in the shape of a strip having a horizontally elongated rectangular cross-section. Suitably, a surface of the stretch rubber layer 13 has a weave pattern transferred from woven fabric in order to reduce noise generated between the stretch rubber layer 13 and a flat pulley in contact with the stretch rubber layer 13.

The adhesive rubber layer 12 and the stretch rubber layer 13 are each made of a rubber composition produced by heating and pressing an uncrosslinked rubber composition prepared by kneading a rubber component blended with various compound ingredients, and crosslinking the kneaded product by a crosslinking agent. Thus, each of the adhesive rubber layer 12 and the stretch rubber layer 13 contains the crosslinked rubber component and various compound ingredients. In order to reduce sticking between the stretch rubber layer 13 and the flat pulley in contact with the stretch rubber layer 13, the stretch rubber layer 13 is suitably made of a rubber composition which is slightly harder than the rubber composition of the adhesive rubber layer 12.

Examples of the rubber components of the rubber compositions that form the adhesive rubber layer 12 and the stretch rubber layer 13 include ethylene-α-olefin elastomer, chloroprene rubber (CR), chlorosulfonated polyethylene rubber (CSM), and hydrogenated acrylonitrile-butadiene rubber (H-NBR). These rubber components are suitably the same as the rubber component of the compressed rubber layer 11.

Similar to the compressed rubber layer 11, examples of the compound ingredient include a reinforcing material such as carbon black, a filler, a processing aid, a vulcanization aid, a crosslinking agent, and a co-crosslinking agent.

The compressed rubber layer 11, the adhesive rubber layer 12, and the stretch rubber layer 13 may be made of the same rubber composition. Alternatively, each of the layers 11, 12, and 13 may be made of a different rubber composition.

The cord 14 is made of twist yarn of fibers, such as polyester fibers (PET), polyethylene naphthalate fibers (PEN), aramid fibers, and vinylon fibers. The diameter of the cord 14 is, for example, 0.5 mm to 2.5 mm. The distance between the centers of the neighboring cords 13 in a cross-section is 0.05 mm to 0.20 mm, for example. The cord 14 undergoes, prior to the molding of the belt, an adhesion treatment in which the cord 14 is soaked in an RFL aqueous solution and then heated and/or an adhesion treatment in which the cord 14 is soaked in rubber cement and then dried, to provide adhesiveness to the adhesive rubber layer 12 of the V-ribbed belt body 10.

(Method for Producing V-Ribbed Belt)

Now, a method for fabricating the V-ribbed belt B according to the first embodiment will be described.

Figure 3:
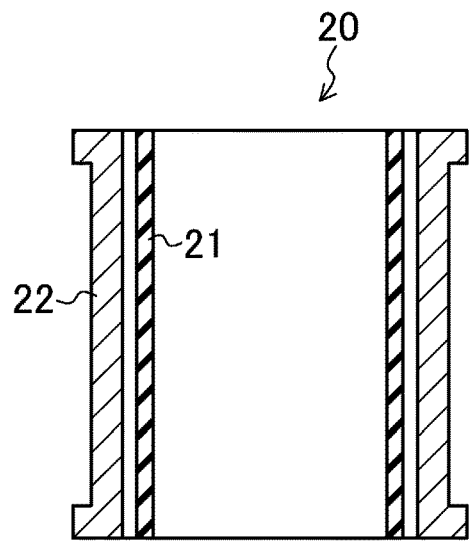
FIG. 3 illustrates a longitudinal cross-sectional view of a belt forming mold.
Figure 4:
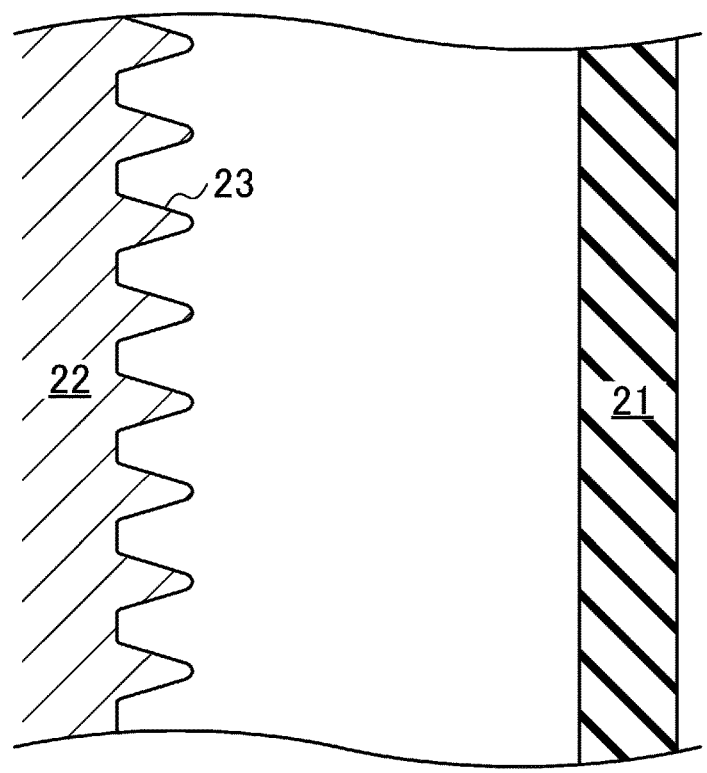
FIG. 4 illustrates an enlarged longitudinal cross-sectional view of a portion of the belt forming mold.

In production of the V-ribbed belt B of the first embodiment, a belt forming mold 20 is used. As illustrated in FIGS. 3 and 4, the belt forming mold 20 includes a cylindrical inner mold 21 and a cylindrical outer mold 22 concentrically arranged with each other.

The inner mold 21 of the belt forming mold 20 is made of a flexible material, such as rubber. The outer mold 22 is made of a rigid material, such as metal. The inner circumferential surface of the outer mold 22 serves as a molding surface, and has V-shaped rib formation grooves 23 arranged at regular pitches in an axial direction. The outer mold 22 is provided with a temperature control mechanism which allows a heating medium, such as water vapor, or a cooling medium, such as water, to flow and control temperature. The belt forming mold 20 is provided with a pressurizing means configured to pressurize and expand the inner mold 21 from inside.

In the production of the V-ribbed belt B of the first embodiment, compound ingredients are added to a rubber component, and the mixture is kneaded by a mixer, such as a kneader and a Banbury mixer. The resultant uncrosslinked rubber composition is shaped into a sheet by calendering, for example, to form an uncrosslinked rubber sheet 11' for making a compressed rubber layer 11. In the uncrosslinked rubber sheet 11' for the compressed rubber layer 11, hydrophobic resin particles and/or hydrophobic resin fibers together with a hydrophilic inorganic filler are contained.

Uncrosslinked rubber sheets 12' and 13' for making the adhesive rubber layer 12 and the stretch rubber layer 13 are formed in a similar manner. After adhesion treatment in which twist yarn 14' to be the cord 14 is soaked in an RFL aqueous solution and heated, adhesion treatment in which the twist yarn 14' is soaked in rubber cement and is heated and dried, is performed.

Figure 5:
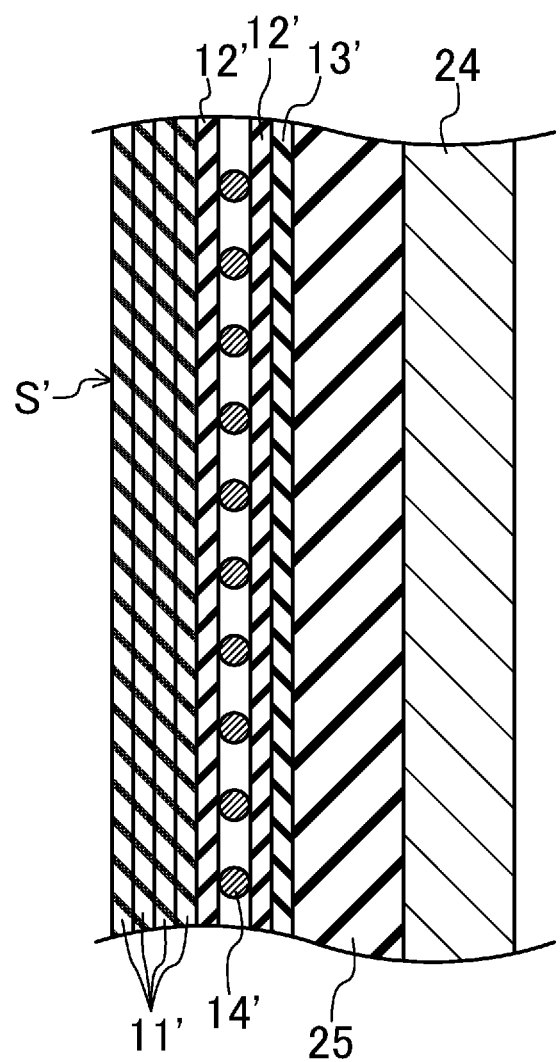
FIG. 5 is a first drawing for explaining a method for producing the V-ribbed belt according to the first embodiment.

Next, as shown in FIG. 5, a rubber sleeve 25 is placed on a cylindrical drum 24 having a smooth surface so as to cover the cylindrical drum 24. Then, the uncrosslinked rubber sheet 13' for making the stretch rubber layer 13 and the uncrosslinked rubber sheet 12' for making the adhesive rubber layer 12 are sequentially wrapped around and layered on the rubber sleeve 25. After that, the twist yarn 14' for making the cord 14 is helically wrapped around the cylindrical inner mold 21, and another uncrosslinked rubber sheet 12' for making the adhesive rubber layer 12 and the uncrosslinked rubber sheet 11' for making the compressed rubber layer are sequentially wrapped around and layered on the wrapped twist yarn 14', thereby forming a layered body S'. In this procedure, the uncrosslinked rubber sheets 11', 12', and 13' are wrapped such that the grain direction thereof corresponds to a belt length direction (i.e., a circumferential direction).

Figure 6:
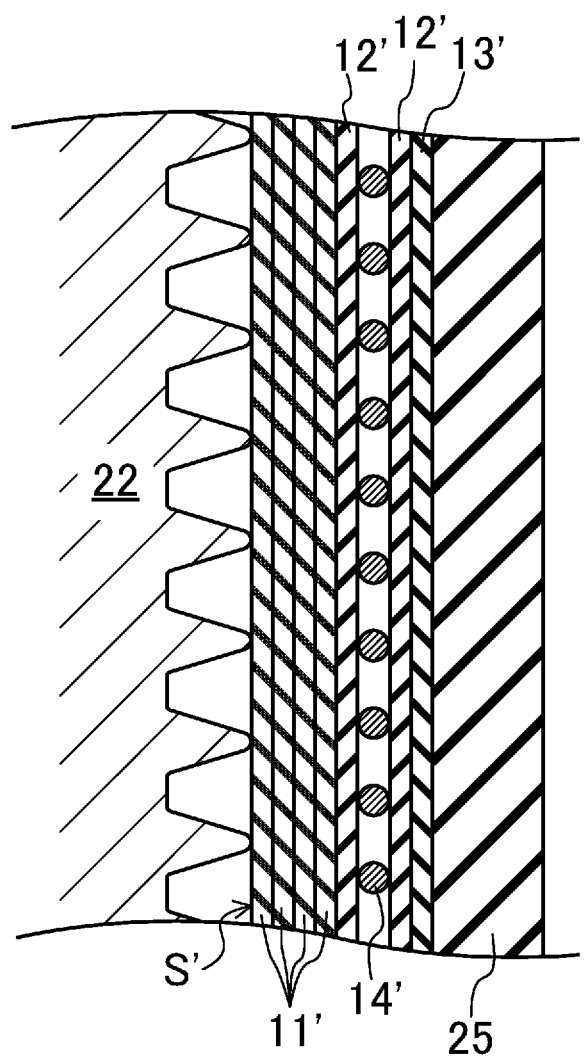
FIG. 6 is a second drawing for explaining the method for producing the V-ribbed belt according to the first embodiment.

Next, the rubber sleeve 25 having the layered body S' is removed from the cylindrical drum 24, and is then fitted to the inner circumferential surface of the outer mold 22 as shown in FIG. 6.

Figure 7:
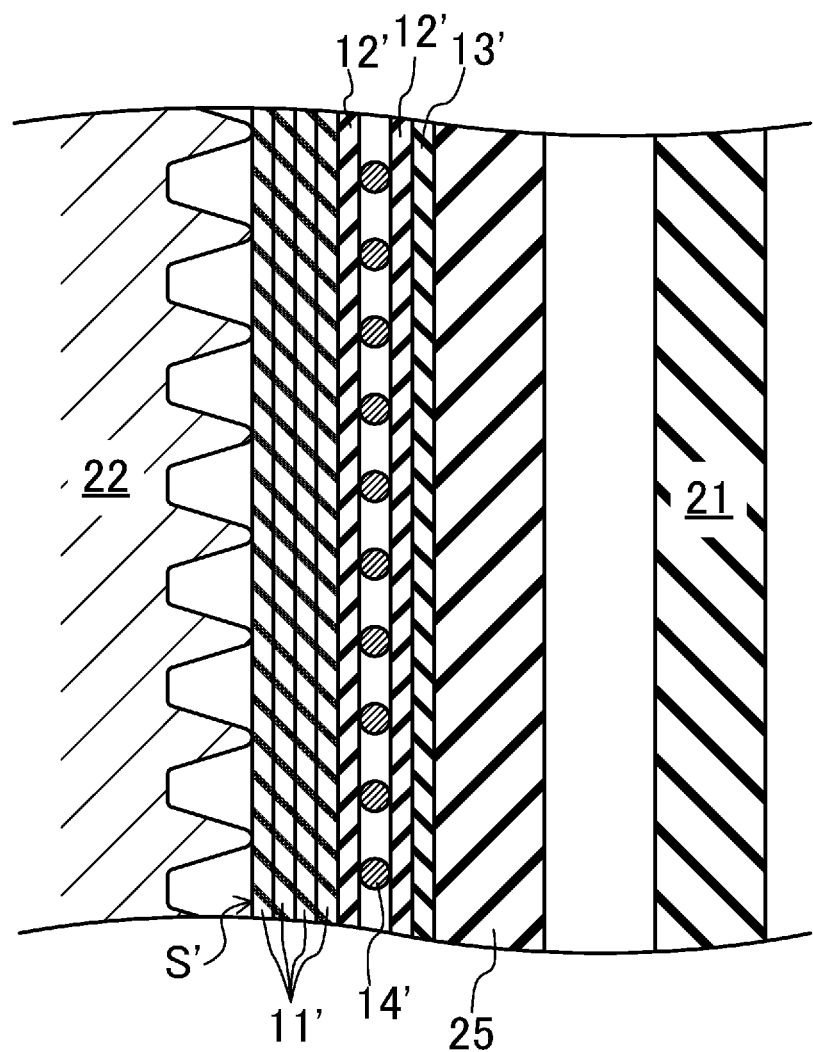
FIG. 7 is a third drawing for explaining the method for producing the V-ribbed belt according to the first embodiment.

Next, as shown in FIG. 7, the inner mold 21 is positioned inside the rubber sleeve 25 set in the outer mold 22, and hermetically sealed.

Figure 8:
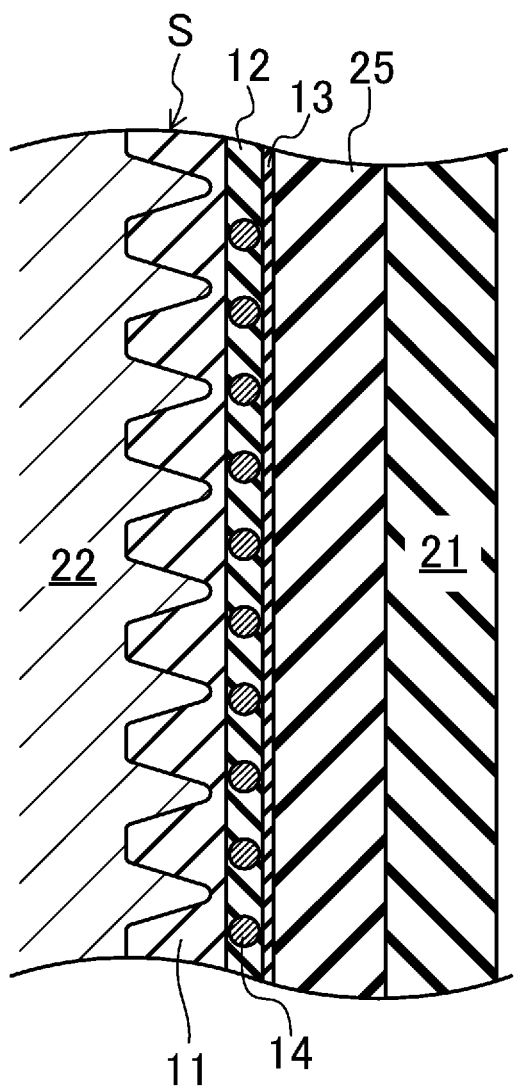
FIG. 8 is a fourth drawing for explaining the method for producing the V-ribbed belt according to the first embodiment.

Subsequently, the outer mold 22 is heated and the inner mold 21 is pressurized by introducing, for example, high-pressure air into its hermetically-sealed inner space. Here, as shown in FIG. 8, the inner mold 21 expands, and the uncrosslinked rubber sheets 11', 12', and 13', of the layered body S', for forming a belt are pressed on the molding surface of the outer mold 22. At the same time, cross-linking of the rubber component is promoted in the sheets, and the sheets are integrated and combined with the twist yarn 14'. A cylindrical belt slab S is formed as a result. The molding temperature of the belt slab S is, for example, 100° C. to 180° C. The molding pressure is, for example, 0.5 MPa to 2.0 MPa. The molding time is, for example, 10 minutes to 60 minutes.

Next, the pressure of the inner space of the inner mold 21 is reduced to remove the sealing, and the belt slab formed between the inner mold 21 and the outer mold 22 via the rubber sleeve 25 is removed. The belt slab is cut into rings having a predetermined width, and turned inside out, thereby obtaining the V-ribbed belt B. If necessary, an outer surface of the belt slab S, i.e., a surface thereof having the V-shaped ribs 15, may be polished.

Figure 9:
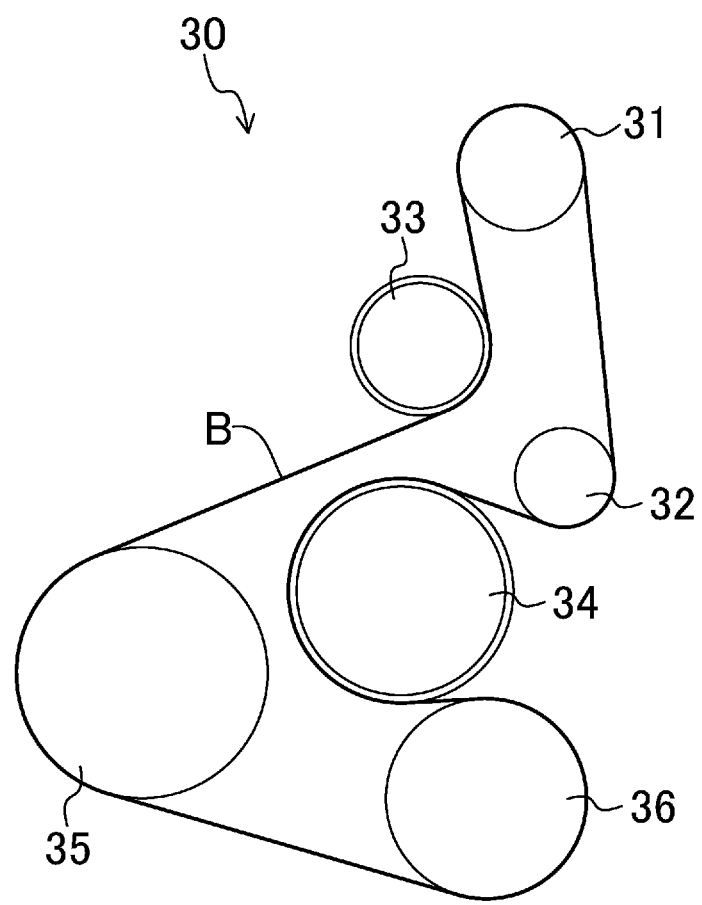
FIG. 9 illustrates a layout of pulleys for an accessory drive belt transmission system of an automobile.

FIG. 9 illustrates a layout of pulleys of an accessory drive belt transmission system 30 of an automobile using the V-ribbed belt B according to the first embodiment. The accessory drive belt transmission system 30 is a serpentine drive system in which the V-ribbed belt B is wrapped around six pulleys including four ribbed pulleys and two flat pulleys to transmit power.

The accessory drive belt transmission system 30 includes a power steering pulley 31, which is a ribbed pulley, at an uppermost position, and an AC generator pulley 32, which is a ribbed pulley, located below the power steering pulley 31. The system 30 also includes a tensioner pulley 33, which is a flat pulley, located at a lower left position of the power steering pulley 31, and a water pump pulley 34, which is a flat pulley, located below the tensioner pulley 33. The system 30 further includes a crank shaft pulley 35, which is a ribbed pulley, located at a lower left position of the tensioner pulley 33, and an air conditioning pulley 36, which is a ribbed pulley, located at a lower right position of the crank shaft pulley 35. These pulleys are made of, for example, pressed metals or castings, or resin moldings made of, for example, nylon resin and phenol resin, with a pulley diameter ranging from φ50 mm to φ150 mm.

In the accessory drive belt transmission system 30, the V-ribbed belt B is wrapped around the power steering pulley 31 with the V-shaped ribs 15 brought into contact with the power steering pulley 31, and then around the tensioner pulley 33 with the backface of the belt B brought into contact with the tensioner pulley 33. After that, the belt B is sequentially wrapped around the crank shaft pulley 35 and the air conditioning pulley 36 with the V-shaped ribs 15 brought into contact with the crank shaft pulley 35 and the air conditioning pulley 36, and further around the water pump pulley 34 with the backface of the belt B brought into contact with the water pump pulley 34. The belt B is then wrapped around the AC generator pulley 32 with the V-shaped ribs 15 brought into contact with the AC generator pulley 32, and returns to the power steering pulley 31 in the end. The belt span length, which is a length of the V-ribbed belt B between the pulleys, is 50 mm to 300 mm, for example. The degree of misalignment allowable between the pulleys is 0° to 2°.

Described below is a reason why the belt of this embodiment reduces abnormal noise in wet condition. First, the abnormal noise in wet condition cited in the present application is due to so-called stick-slip on a friction area between the pulley contact surface of the power transmission belt and a pulley. When the power transmission belt is wet, a coefficient of friction of the transmission belt drops. When the friction area has both a wet area and an unwet area, the frictional force varies depending on the areas. This tends to cause the stick-slip, and eventually abnormal noise.

In contrast, when the entire friction area is wet, the stick-slip is reduced. Thus, the rubber layer included in the pulley contact surface is made of a rubber composition containing a hydrophilic inorganic filler, so that the pulley contact surface is likely to be wet and the stick-slip is reduced. Moreover, resin particles and/or resin fibers are added as a sliding-resistant material to the rubber layer included in the pulley contact surface. Such a feature reduces the decline in power transmission performance. Wet portions of the sliding-resistant material exposed from the pulley contact surface are a cause of an increase in frictional force, by meniscus force, between the power transmission belt and a pulley, and of the resultant stick-slip. In order to address this problem, the belt of the present disclosure includes particles and/or fibers made of hydrophobic resin so that the sliding-resistant material is less likely to be wet to reduce the occurrence of meniscus force. Such a feature makes it possible to reduce the risks of the stick-slip and the generation of the abnormal noise.

As can be seen, suitably, the silica included in the inorganic filler does not receive coupling treatment. Specifically, when blended with the rubber composition, silica is treated typically with a silane coupling agent in order to improve dispersibility of the silica into the rubber component. However, in this embodiment, the silica may be used suitably without coupling treatment. In addition, the coupling agent is not suitably used as a compound ingredient for the rubber composition. As a result, the rubber composition is blended with highly hydrophilic silica, such that the pulley contact surface of the belt is likely to be wet. Such a feature is desirable for reducing the abnormal noise.

In a similar manner, the inorganic filler suitably contains Ca-montmorillonite. Montmorillonite absorbs cations such as $Na^+$, $K^+$, $Ca^{2+}$, $Mg^{2+}$. The most absorbed cations are Na-cations such as $Na^+$ and Ca-cations such as $Ca^{2+}$. Compared with Na-montmorillonite, Ca-montmorillonite excels in absorptivity, and is suitable to an attempt made in this embodiment; that is, to make the pulley contact surface easy to wet.

Second Embodiment

Figure 10:
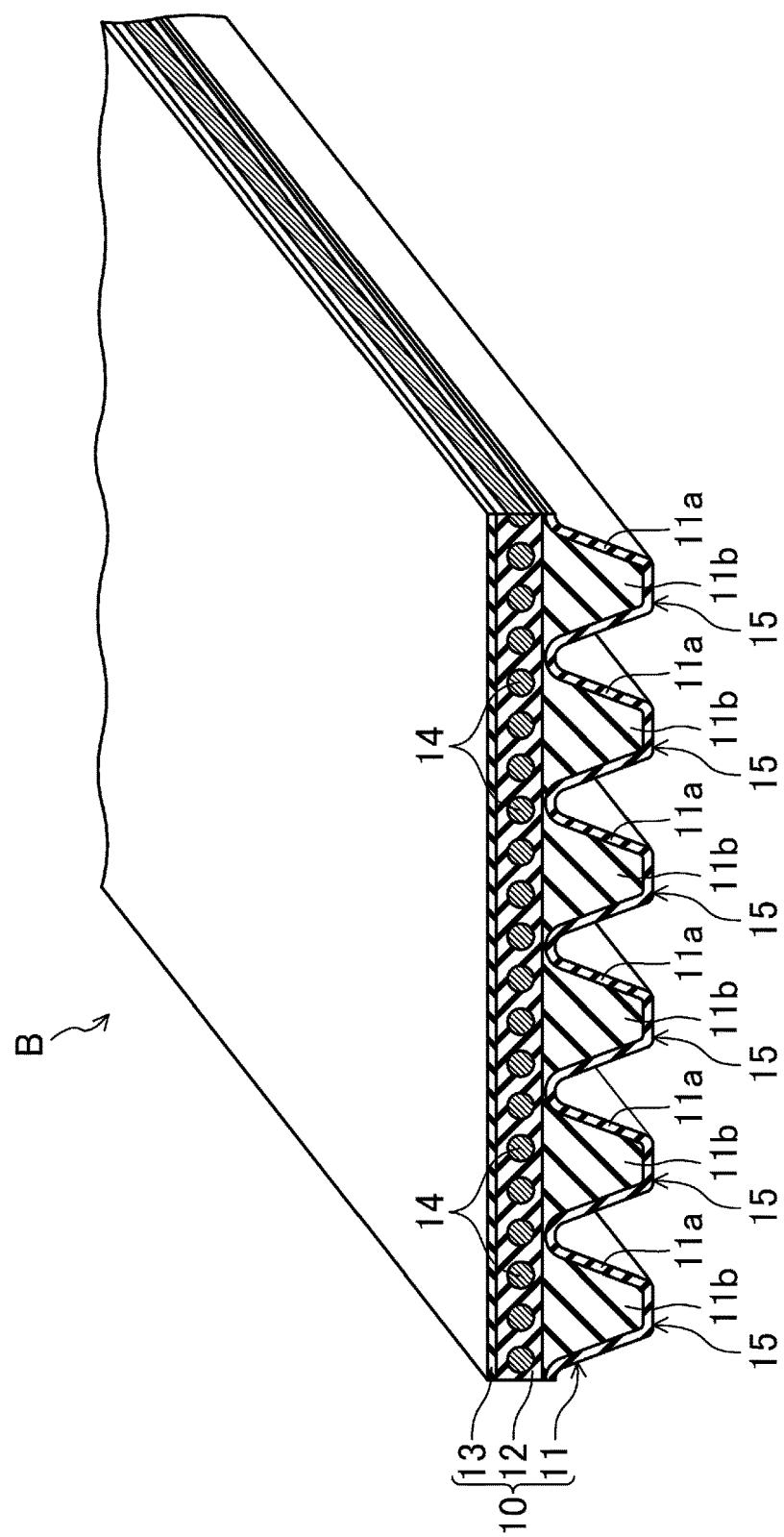
FIG. 10 illustrates a perspective view of a V-ribbed belt according to a second embodiment.
Figure 11:
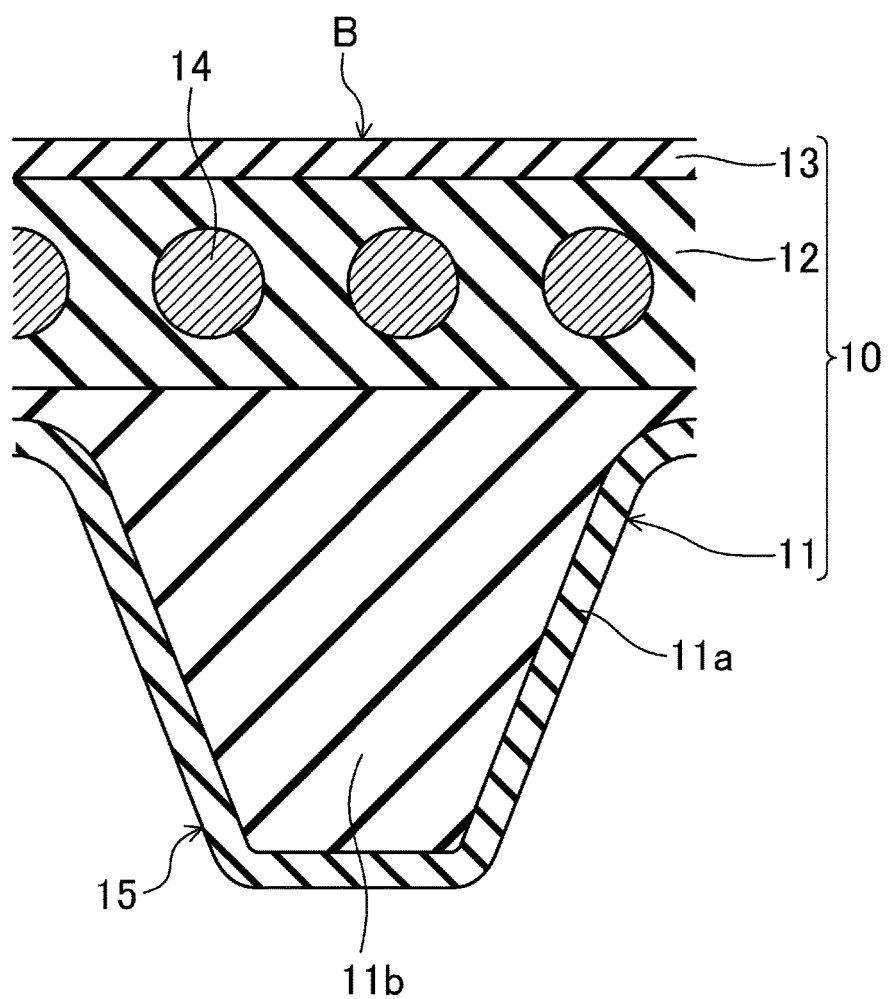
FIG. 11 illustrates a cross-sectional view of a single V-shaped rib of the V-ribbed belt according to the second embodiment.

FIGS. 10 and 11 illustrate the V-ribbed belt B of a second embodiment. Like reference characters have been used to designate the same elements as those in the first embodiment.

According to the second embodiment, the compressed rubber layer 11 of the V-ribbed belt B has a surface rubber layer 11a and an inner rubber portion 11b. The surface rubber layer 11a is layered on the entire surfaces of the V-shaped ribs 15. The surfaces of the V-shaped ribs 15 included in the surface rubber layer 11a constitute a pulley contact surface acting as a power transmission face. The surface rubber layer 11a has a thickness from 50 μm to 500 μm, for example. The inner rubber portion 11b is located inside the surface rubber layer 11a and forms the other portion of the compressed rubber layer 11 besides the surface rubber layer 11a.

Similar to the compressed rubber layer 11 of the first embodiment, the surface rubber layer 11a is made of a rubber composition containing: a crosslinked rubber component; a sliding-resistant material (hydrophobic resin particles and/or hydrophobic resin fibers) dispersed in the rubber component; and various compound ingredients including a hydrophilic inorganic filler.

The inner rubber portion 11b is made of a rubber composition containing a crosslinked rubber component and various compound ingredients. The rubber composition making the inner rubber portion 11b may contain the sliding-resistant material and the hydrophilic inorganic filler. The rubber composition making the inner rubber portion 11b may be the same as the rubber composition making the adhesive rubber layer 12 or the stretch rubber layer 13.

In the V-ribbed belt B according to the second embodiment described above, the surface rubber layer 11a included in the pulley contact surface is made of the rubber composition containing: the hydrophobic resin particles and/or the hydrophobic resin fibers; and the hydrophilic inorganic filler. Such a feature improves hydrophilicity of the pulley contact surface and allows the hydrophobic sliding-resistant material to be dispersed in and exposed from the pulley contact surface. Hence, the V-ribbed belt B can reduce abnormal noise in a wet condition as shown in Examples, which will be described later.

Figure 12:
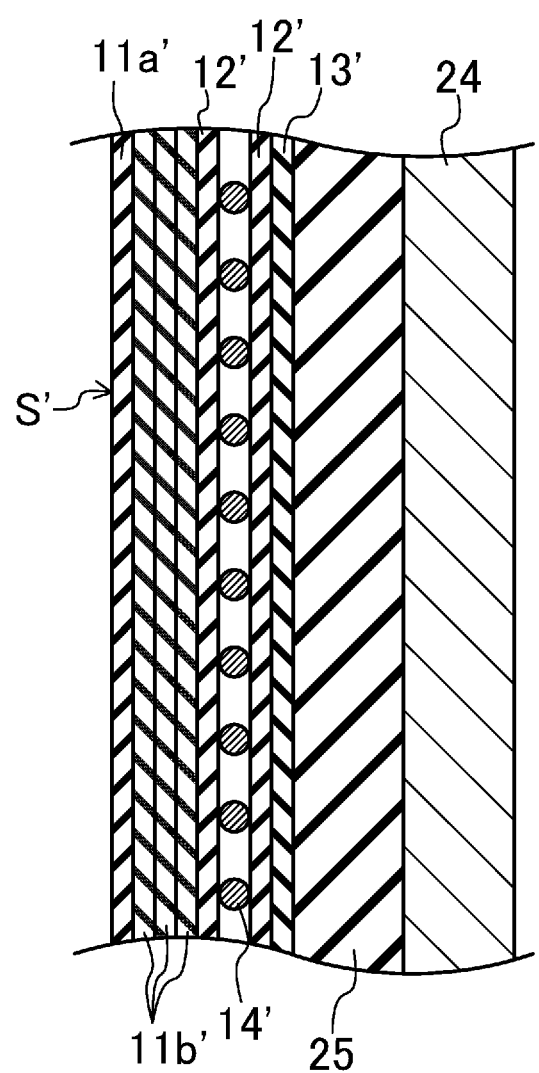
FIG. 12 is a first drawing for explaining a method for producing the V-ribbed belt according to the second embodiment.
Figure 13:
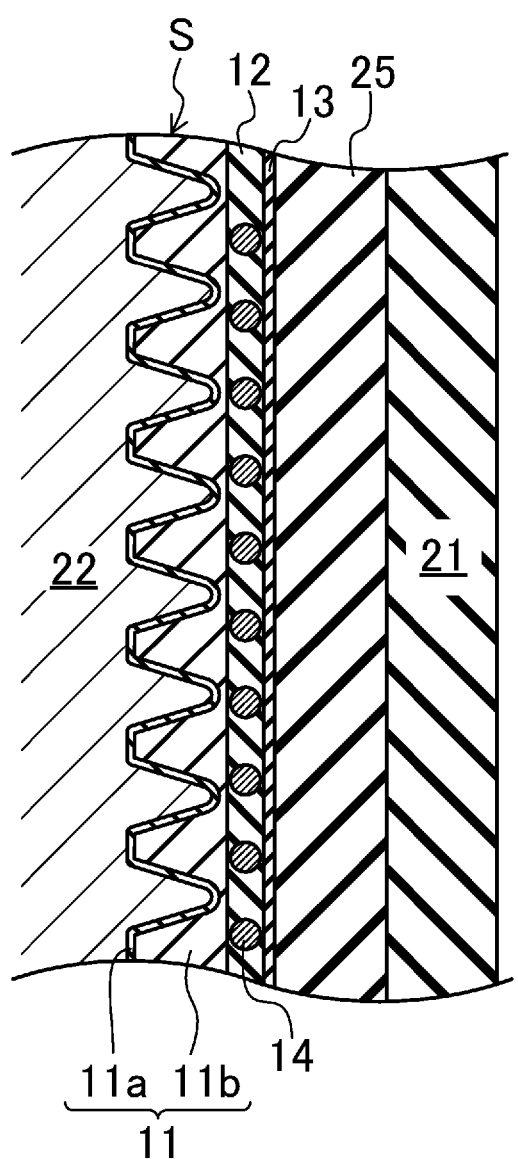
FIG. 13 is a second drawing for explaining the method for producing the V-ribbed belt according to the second embodiment.

In order to produce the V-ribbed belt B according to the second embodiment, uncrosslinked rubber sheets 11a', 11b' for making the surface rubber layer and inner rubber portion of the compressed rubber layer 11 are prepared. In the uncrosslinked rubber sheet 11a' for the compressed rubber layer 11, hydrophobic resin particles and/or hydrophobic resin fibers together with a hydrophilic inorganic filler are contained. Next, as shown in FIG. 12, by a similar method to the method of the first embodiment, the uncrosslinked rubber sheet 13' for making a stretch rubber layer and the uncrosslinked rubber sheet 12' for making an adhesive rubber layer are sequentially wrapped around and layered on the rubber sleeve 25 placed on the cylindrical drum 24 having a smooth surface. After that, the twist yarn 14' for making the cord 14 is helically wrapped around the cylindrical inner mold 21. Another uncrosslinked rubber sheet 12' for making the adhesive rubber layer, an uncrosslinked rubber sheet 11b' for making the inner rubber portion of the compressed rubber layer 11, and an uncrosslinked rubber sheet 11a' for making the surface rubber layer are sequentially wrapped around and layered on the wrapped twist yarn 14', thereby forming an layered body S'. A cylindrical belt slab S as illustrated in FIG. 13 is formed from this layered body S'.

The other features and advantages are the same as those of the first embodiment.

Third Embodiment

Figure 14:
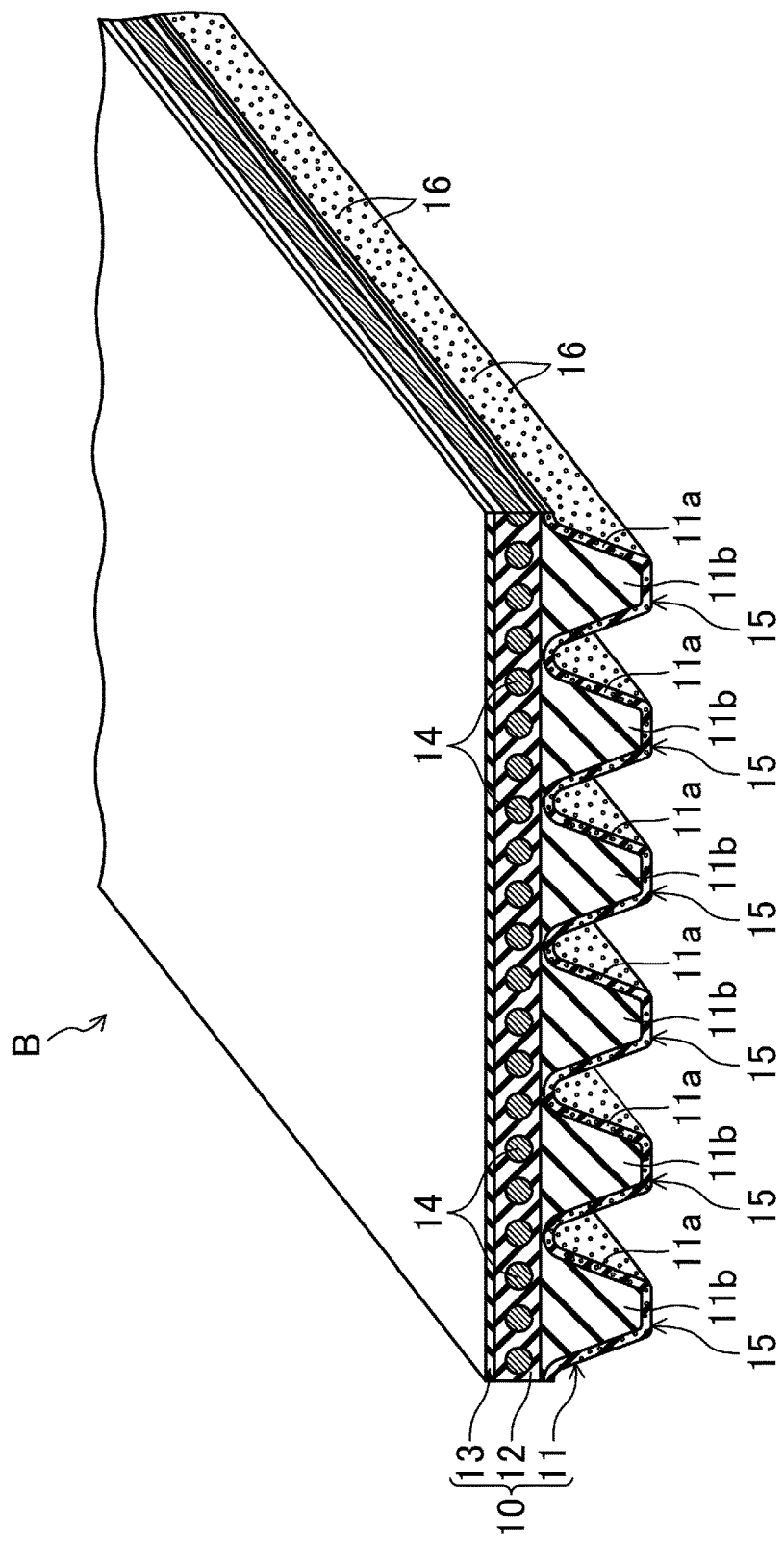
FIG. 14 illustrates a perspective view of a V-ribbed belt according to a third embodiment.
Figure 15:
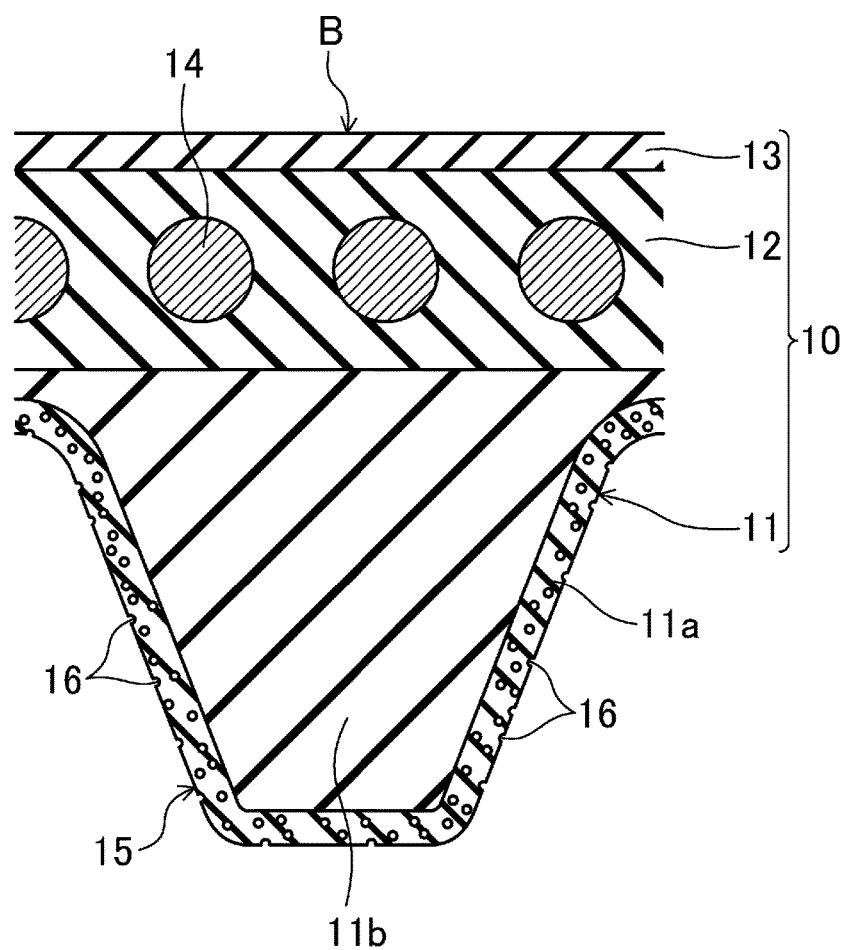
FIG. 15 illustrates a cross-sectional view of a single V-shaped rib of the V-ribbed belt according to the third embodiment.

FIGS. 14 and 15 illustrate the V-ribbed belt B of a third embodiment. Like reference characters have been used to designate the same elements as those in the first embodiment.

According to the third embodiment, the compressed rubber layer 11 of the V-ribbed belt B has the surface rubber layer 11a and the inner rubber portion 11b. The surface rubber layer 11a is made of porous rubber, layered on the entire surfaces of the V-shaped ribs 15, and forms a pulley contact surface on the inner surface portion of the belt. The surface rubber layer 11a has a thickness from 50 μm to 500 μm, for example. The inner rubber portion 11b is made of solid rubber, located inside the surface rubber layer 11a, and forms the other portion of the compressed rubber layer 11 besides the surface rubber layer 11a.

The term "porous rubber" used herein means a crosslinked rubber composition having many hollow portions therein and having a surface with many recesses 16, and may have either a structure in which the hollow portions and the recesses 16 are distributed or a structure in which the hollow portions and the recesses 16 communicate with each other. The term "solid rubber" used herein means a crosslinked rubber composition that is not made of "porous rubber" and has no hollow portions or no recesses 16.

Similar to the compressed rubber layer 11 of the first embodiment, the surface rubber layer 11a is made of a rubber composition containing: a crosslinked rubber component; hydrophobic resin particles and/or hydrophobic resin fibers dispersed in the rubber component; and various compound ingredients including a hydrophilic inorganic filler. In addition, the surface rubber layer 11a is made of porous rubber. Thus, the uncrosslinked rubber composition before being formed into the surface rubber layer 11a contains unexpanded hollow particles and/or a foaming agent for forming porous rubber.

Examples of the unexpanded hollow particles include particles including a solvent encapsulated in a shell made of a thermoplastic polymer (e.g., an acrylonitrile polymer) or any other suitable material. The hollow particles may be comprised of either one kind or two or more kinds of these particles. The content of the hollow particles with respect to 100 parts by mass of the rubber component is suitably 0.5 parts by mass to 10 parts by mass. Examples of the foaming agent include organic foaming agents, such as an ADCA foaming agent containing azodicarbonamide as the main ingredient, a DPT foaming agent containing dinitrosopentamethylenetetramine as the main ingredient, an OBSH foaming agent containing p,p'-oxybisbenzenesulfonylhydrazide as the main ingredient, and an HDCA foaming agent containing hydrazodicarbonamide as the main ingredient. Suitably, the foaming agent is comprised of one kind or two or more kinds of these substances. The content of the foaming agent with respect to 100 parts by mass of the rubber component is suitably 0.5 parts by mass to 10 parts by mass.

The surface rubber layer 11a, which is made of porous rubber, has a surface with many recesses 16. The average diameter of the recesses 16 is suitably 10 μm to 150 μm. The average diameter of the recesses 16 is determined by the number-average diameter from 50 to 100 recesses measured with a surface image.

The inner rubber portion 11b is made of a rubber composition containing a crosslinked rubber component and various compound ingredients. The rubber composition making the inner rubber portion 11b may be the same as the rubber composition making the surface rubber layer 11a except for the hollow portions and the recesses 16.

The rubber composition making the inner rubber portion 11b may contain: the hydrophobic resin particles and/or hydrophobic resin fibers; and the hydrophilic inorganic filler. The rubber composition making the inner rubber portion 11b may be the same as the rubber composition making the adhesive rubber layer 12 or the stretch rubber layer 13.

The V-ribbed belt B according to the third embodiment can reduce abnormal noise in a wet condition as shown in Examples, which will be described later, because the surface rubber layer 11a forming the pulley contact surface is made of the rubber composition containing: the hydrophobic resin particles and/or the hydrophobic resin fibers; and hydrophilic inorganic filler so that the hydrophilicity of the pulley contact surface improves, and the sliding-resistant material (the hydrophobic resin particles and/or hydrophobic resin fibers) are dispersed in and exposed from the pulley contact surface.

In order to produce the V-ribbed belt B according to the third embodiment, uncrosslinked rubber sheets 11a', 11b' for making the surface rubber layer and inner rubber portion of the compressed rubber layer 11 are prepared. In the uncrosslinked rubber sheet 11a' for the surface rubber layer, hollow particles and/or a foaming agent is contained together with hydrophobic resin particles and/or hydrophobic resin fibers and a hydrophilic inorganic filler. Next, as shown in FIGS. 12 and 13, by a similar method to the method of the second embodiment, the uncrosslinked rubber sheet 13' for making a stretch rubber layer and the uncrosslinked rubber sheet 12' for making an adhesive rubber layer are sequentially wrapped around and layered on the rubber sleeve 25 placed on the cylindrical drum 24 having a smooth surface. After that, the twist yarn 14' for making the cord is helically wrapped around the cylindrical inner mold 21. Another uncrosslinked rubber sheet 12' for making the adhesive rubber layer, an uncrosslinked rubber sheet 11b' for making the inner rubber portion of the compressed rubber layer 11, and an uncrosslinked rubber sheet 11a' for making the surface rubber layer are sequentially wrapped around and layered on the wrapped twist yarn 14', thereby forming an layered body S'. A cylindrical belt slab S is formed from this layered body S'.

The other features and advantages are the same as those of the first embodiment.

Other Embodiments

Figure 16A:
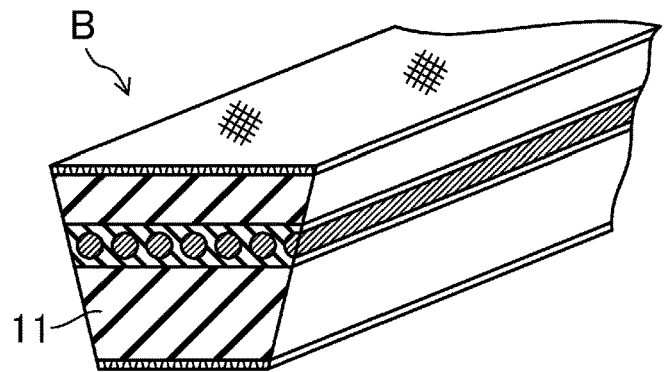
FIG. 16A illustrates a perspective view of a raw edge V-belt according to another embodiment.
Figure 16B:
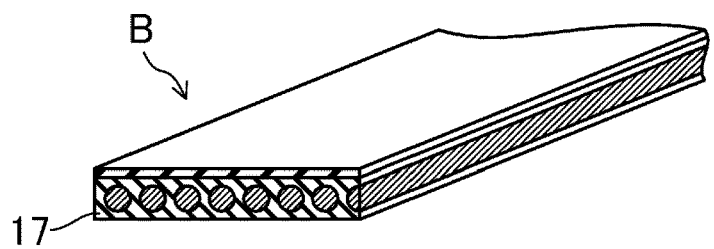
FIG. 16B illustrates a perspective view of a flat belt according to another embodiment.

In the above first to third embodiments, the V-ribbed belt B has been described as a non-limiting example of the friction transmission belt. The friction transmission belt may also be (i) a raw edge V-belt B having the compressed rubber layer 11 included in the pulley contact surface on the inner side of the belt as illustrated in FIG. 16A, or (ii) a flat belt B having the inner rubber layer 17 included in the pulley contact surface on the inner surface portion of the belt as illustrated in FIG. 16B.

EXAMPLES (V-Ribbed Belt)
V-ribbed belts of the following Examples 1 to 17 and Comparative Examples 1 to 7 were produced. The composition of each belt will also be shown in Tables 1 and 2.

Example 1

An EPDM as a rubber component was placed in a chamber of an internal Banbury mixer and was masticated therein. Subsequently, with respect to 100 parts by mass of this rubber component, 2 parts by mass of ISAF carbon black, 50 parts by mass of polyethylene resin particles (Manufactured by Mitsui Chemicals, Inc., Trade Name: HI-ZEX MILLION 240S, Average Molecular Weight: Approximately 2 millions), 40 parts by mass of silica (Manufactured by Degussa AG, Trade Name: ULTRASIL VN3), 40 parts by mass of layered silicate (Manufactured by Hojun Co., Ltd., Trade Name: Montmorillonite Hotaka), 5 parts by mass of calcium carbonate (Manufactured by Shiraishi Kogyo Kaisya Ltd., Trade Name: ACTIFORT 700), 2.6 parts by mass of hollow particles (Manufactured by Sekisui Chemical Co., Ltd., Trade Name: EM403), 7.3 parts by mass of foaming agent (Sankyo Kasei Co. Ltd., Trade Name: Cell-Mike CE), 0.5 parts by mass of stearic acid, 5 parts by mass of zinc oxide, 8 parts by mass (actually 3.2 parts by mass taking purity into consideration) of organic peroxide crosslinking agent having a purity of 40 percent by mass (Manufactured by NOF Corporation, Trade Name: PEROXYMON F40), and 2 parts by mass of co-crosslinking agent (Seiko Chemical Co. Ltd., Trade Name: Hi-Cross M) were added to the rubber composition and kneaded. Thus, an uncrosslinked rubber composition was obtained. Using the obtained uncrosslinked rubber composition for the surface rubber layer of the compressed rubber layer, a V-ribbed belt having similar compositions as those in the third embodiment was produced as Example 1.

The silica (ULTRASIL VN3) does not receive coupling treatment. Furthermore, Montmorillonite Hotaka is a product made of Ca-montmorillonite modified with soda ash.

Each of the inner rubber portions of the compressed rubber layer, the adhesive rubber layer, and the backface rubber layer was made of another rubber composition containing an EPDM as a rubber component. A cord was made of twist yarn of polyethylene terephthalate fibers. The belt had a length of 900 mm, a width of 21.36 mm, and a thickness of 4.3 mm, and included six ribs. The surface to the V-shaped ribs was polished.

Example 2

In the uncrosslinked rubber composition used in Example 1, 40 parts by mass (with respect to 100 parts by mass of the rubber component, the same hereinafter in Examples 2 to 13 and Comparative Examples 1 to 5) of Ben-Gel Blight 11 (Trade Name) manufactured by Hojun Co., Ltd. was used as montmorillonite (i.e., a kind of the inorganic filler). Other than the montmorillonite, a V-ribbed belt having the same compositions as those in Example 1 was produced as Example 2.

The montmorillonite (Ben-Gel Blight 11) used was Ca-montmorillonite.

Example 3

In the uncrosslinked rubber composition used in Example 2, the content of the polyethylene resin particles was 70 parts by mass, and no foaming agent was contained. Other than the polyethylene resin particles and the absence of foaming agent, a V-ribbed belt having the same compositions as those in Example 2 was produced as Example 3.

Example 4

In the uncrosslinked rubber composition used in Example 2, the content of the polyethylene resin particles was 100 parts by mass, the content of the hollow particles was 3.1 parts by mass, and no foaming agent was contained. Other than the polyethylene resin particles, the hollow particles, and the absence of foaming agent, a V-ribbed belt having the same compositions as those in Example 2 was produced as Example 4.

Example 5

In the uncrosslinked rubber composition used in Example 1, 80 parts by mass of HI-ZEX MILLION 630M (Trade Name) manufactured by Mitsui Chemicals, Inc. was used as polyethylene particles, and 40 parts by mass of Ben-Gel Blight 11 was used as montmorillonite. The content of the hollow particles was 2.7 parts by mass, and no foaming agent was contained. Other than those substances, a V-ribbed belt having the same compositions as those in Example 1 was produced as Example 5.

Example 6

In the uncrosslinked rubber composition used in Example 5, 30 parts by mass of ULTRASIL VN3 was used as silica. Furthermore, the content of carbon black was 12 parts by mass. Other than those substances, a V-ribbed belt having the same compositions as those in Example 5 was produced as Example 6.

Example 7

In the uncrosslinked rubber composition used in Example 6, the content of the hollow particles was 2.8 parts by mass. Moreover, 20 parts by mass of zinc methacrylate (Kawaguchi Chemical Industry Co, Ltd. Trade Name: ACTOR ZMA) was contained in addition to 2 parts by mass of Hi-Cross M in Example 6 as a co-crosslinking agent. Other than those substances, a V-ribbed belt having the same compositions as those in Example 6 was produced as Example 7.

Example 8

In the uncrosslinked rubber composition used in Example 1, the content of polyethylene particles was 80 parts by mass, and 40 parts by mass of Ben-Gel Blight 11 was used as montmorillonite. The content of the hollow particles was 2.7 parts by mass, and no foaming agent was contained. Other than those substances, a V-ribbed belt having the same compositions as those in Example 1 was produced as Example 8.

Example 9

In the uncrosslinked rubber composition used in Example 8, polyethylene particles as a sliding-resistant material were not contained. Contained instead were 25 parts by mass of polyethylene terephthalate (PET) short fibers. Other than those substances, a V-ribbed belt having the same compositions as those in Example 8 was produced as Example 9.

Example 10

In the uncrosslinked rubber composition used in Example 8, 2 parts by mass of HAF carbon was used as carbon black. Other than the HAF carbon, a V-ribbed belt having the same compositions as those in Example 8 was produced as Example 10.

Example 11

In the uncrosslinked rubber composition used in Example 10, the content of silica was 60 parts by mass, and no montmorillonite was contained. Other than those substances, a V-ribbed belt having the same compositions as those in Example 10 was produced as Example 11.

Example 12

In the uncrosslinked rubber composition used in Example 10, 40 parts by mass of Ben-Gel HPV (trade name) manufactured by Hojun Co., Ltd. was used as montmorillonite. Other than Ben-Gel HPV, a V-ribbed belt having the same compositions as those in Example 10 was produced as Example 12.

Example 13

In the uncrosslinked rubber composition used in Example 10, 40 parts by mass of Montmorillonite Hotaka was used as montmorillonite. Other than Montmorillonite Hotaka, a V-ribbed belt having the same compositions as those in Example 10 was produced as Example 13.

Example 14

In the uncrosslinked rubber composition used in Example 1, the content of the polyethylene particles was 50 parts by mass, and the content of silica was 50 parts by mass. No montmorillonite was contained. The content of the hollow particles was 2.7 parts by mass, and no foaming agent was contained. Other than those substances, a V-ribbed belt having the same compositions as those in Example 1 was produced as Example 14.

Example 15

In the uncrosslinked rubber composition used in Example 14, the content of silica was 40 parts by mass. Other than the silica, a V-ribbed belt having the same compositions as those in Example 14 was produced as Example 15.

Example 16

In the uncrosslinked rubber composition used in Example 14, the content of silica was 30 parts by mass. Other than the silica, a V-ribbed belt having the same compositions as those in Example 14 was produced as Example 16.

Comparative Example 1

In the uncrosslinked rubber composition used in Example 1, the content of ISAF Carbon Black was 42 parts by mass. No silica or calcium carbonate was contained. As montmorillonite, 30 parts by mass of Ben-Gel Blight 11 was used. Other than those substances, a V-ribbed belt having the same compositions as those in Example 1 was produced as Comparative Example 1.

Comparative Example 2

In the uncrosslinked rubber composition used in Comparative Example 1, the content of the polyethylene particles was 80 parts by mass. As montmorillonite, 30 parts by mass of Ben-Gel HPV was used. The content of the hollow particles was 2.9 parts by mass, and no foaming agent was contained. Other than those substances, a V-ribbed belt having the same compositions as those in Comparative Example 1 was produced as Comparative Example 2.

Comparative Example 3

In the uncrosslinked rubber composition used in Comparative Example 1, the content of the polyethylene particles was 80 parts by mass. The content of the hollow particles was 2.8 parts by mass, and no foaming agent was contained. Other than those substances, a V-ribbed belt having the same compositions as those in Comparative Example 1 was produced as Comparative Example 3.

Comparative Example 4

In the uncrosslinked rubber composition used in Comparative Example 1, 80 parts by mass of HI-ZEX MILLION 630M was used as polyethylene particles. The content of the hollow particles was 2.7 parts by mass, and no foaming agent was contained. Other than those substances, a V-ribbed belt having the same compositions as those in Comparative Example 1 was produced as Comparative Example 4.

Comparative Example 5

In the uncrosslinked rubber composition used in Comparative Example 1, polyethylene particles as a sliding-resistant material were not contained. Contained instead were 80 parts by mass of vinylon resin particles. Furthermore, the content of montmorillonite was 40 parts by mass. The content of the hollow particles was 2.9 parts by mass, and no foaming agent was contained. Other than those substances, a V-ribbed belt having the same compositions as those in Comparative Example 1 was produced as Comparative Example 5.

Comparative Example 6

In the uncrosslinked rubber composition used in Comparative Example 1, the content of carbon black was 2 parts by mass. Polyethylene particles as a sliding-resistant material were not contained. Contained instead were 25 parts by mass of 66 nylon short fibers. As silica, 40 parts by mass of ULTRASIL VN3 was contained. Furthermore, the content of montmorillonite was 40 parts by mass. 5 parts by mass of calcium carbonate was contained. The content of the hollow particles was 2.7 parts by mass, and no foaming agent was contained. Other than those substances, a V-ribbed belt having the same compositions as those in Comparative Example 1 was produced as Comparative Example 6.

Comparative Example 7

In the uncrosslinked rubber composition used in Comparative Example 6, 66 nylon short fibers were not contained. Contained instead were 80 parts by mass of nylon resin particles. Other than the nylon resin particles, a V-ribbed belt having the same compositions as those in Comparative Example 6 was produced as Comparative Example 7.

TABLE 1

| Material Type | Material Name | Example 1 | 2 | 3 | 4 | 5 | 6 | 7 | 8 | 9 | 10 | 11 |
|---|---|---|---|---|---|---|---|---|---|---|---|---|
| Polymer | EPDM | 100 | 100 | 100 | 100 | 100 | 100 | 100 | 100 | 100 | 100 | 100 |
| Carbon | ISAF | 2 | 2 | 2 | 2 | 2 | 12 | 12 | 2 | 2 | | |
| | HAF | | | | | | | | | | 2 | 2 |
| Sliding-Resistant Material | Polyethylene Particles HI-ZEX MILLION 240S | 50 | 50 | 70 | 100 | | | | 80 | | 80 | 80 |
| | Polyethylene Particles HI-ZEX MILLION 630M | | | | | 80 | 80 | 80 | | | | |
| | Nylon Particles Unitika A1030CP200A | | | | | | | | | | | |
| | Vinylon Particles Vinylon Powder | | | | | | | | | | | |
| | 66 Nylon Short Fibers CFN1000 | | | | | | | | | | | |
| | PET Short Fibers PET6.0De, REG, Dip | | | | | | | | | 25 | | |

TABLE 1-continued

| Material Type | Material Name | Example 1 | 2 | 3 | 4 | 5 | 6 | 7 | 8 | 9 | 10 | 11 |
|---|---|---|---|---|---|---|---|---|---|---|---|---|
| Hydrophilic Inorganic Filler | Silica ULTRASIL VN4 | 40 | 40 | 40 | 40 | 40 | 30 | 30 | 40 | 40 | 40 | 60 |
| | Montmorillonite Hotaka | 40 | | | | | | | | | | |
| | Montmorillonite Ben-Gel HVP | | | | | | | | | | | |
| | Montmorillonite Ben-Gel Blight 11 | | 40 | 40 | 40 | 40 | 40 | 40 | 40 | 40 | 40 | |
| | Calcium Carbonate ACTIFORT 701 | 5 | 5 | 5 | 5 | 5 | 5 | 5 | 5 | 5 | 5 | 5 |
| Hollow Particles | EM403 | 2.6 | 2.6 | 2.6 | 3.1 | 2.7 | 2.7 | 2.8 | 2.7 | 2.7 | 2.7 | 2.7 |
| Foaming Agent | Cell-Mike CE | 7.3 | 7.3 | | | | | | | | | |
| Vulcanization Aid | Stearic Acid | 0.5 | 0.5 | 0.5 | 0.5 | 0.5 | 0.5 | 0.5 | 0.5 | 0.5 | 0.5 | 0.5 |
| | Zinc Oxide Group 3 | 5.0 | 5.0 | 5.0 | 5.0 | 5.0 | 5.0 | 5.0 | 5.0 | 5.0 | 5.0 | 5.0 |
| Vulcanizing Agent | PEROXYMON F40 | 8.0 | 8.0 | 8.0 | 8.0 | 8.0 | 8.0 | 8.0 | 8.0 | 8.0 | 8.0 | 8.0 |
| Co-Crosslinking Agent | Hi-Cross M/TMP | 2.0 | 2.0 | 2.0 | 2.0 | 2.0 | 2.0 | 2.0 | 2.0 | 2.0 | 2.0 | 2.0 |
| | ACTOR ZMA/Zinc Methacrylate | | | | | | | 20.0 | | | | |
| | Total PHR | 262.4 | 262.4 | 275.1 | 305.6 | 285.2 | 285.2 | 305.3 | 285.2 | 230.2 | 285.2 | 265.2 |
| | Total Amount of Hydrophilic Inorganic Filler | 85 | 85 | 85 | 85 | 85 | 75 | 75 | 85 | 85 | 85 | 65 |
| | Official Regain of Sliding-Resistant Material (%) JISL-0105 | 0 | 0 | 0 | 0 | 0 | 0 | 0 | 0 | 0 | 0 | 0 |
| | Abnormal Noise in Wet Condition with Rotation Variation Tension when Abnormal Noise is Generated (N/6ribs) | None | None | None | None | None | None | None | None | None | None | None |

TABLE 2

| Material Type | Material Name | Example 12 | 13 | 14 | 15 | 16 | Comparative Example 1 | 2 | 3 | 4 | 5 | 6 | 7 |
|---|---|---|---|---|---|---|---|---|---|---|---|---|---|
| Polymer | EPDM | 100 | 100 | 100 | 100 | 100 | 100 | 100 | 100 | 100 | 100 | 100 | 100 |
| Carbon | ISAF | | | 2 | 2 | 2 | 42 | 42 | 42 | 42 | 42 | 2 | 2 |
| | HAF | 2 | 2 | | | | | | | | | | |
| Sliding-Resistant Material | Polyethylene Particles HI-ZEX MILLION 240S | 80 | 80 | 50 | 50 | 50 | 50 | 80 | 80 | | | | |
| | Polyethylene Particles HI-ZEX MILLION 630M | | | | | | | | | 80 | | | |
| | Nylon Particles Unitika A1030CP200A | | | | | | | | | | | | 80 |
| | Vinylon Particles Vinylon Powder | | | | | | | | | | 80 | | |
| | 66 Nylon Short Fibers CFN1000 | | | | | | | | | | | 25 | |
| | PET Short Fibers PET6.0De, REG, Dip | | | | | | | | | | | | |
| Hydrophilic Inorganic Filler | Silica ULTRASIL VN4 | 40 | 40 | 50 | 40 | 30 | | | | | | 40 | 40 |
| | Montmorillonite Hotaka | | 40 | | | | | | | | | | |
| | Montmorillonite Ben-Gel HVP | 40 | | | | | | | 30 | | | | |
| | Montmorillonite Ben-Gel Blight 11 | | | | | | 30 | 30 | | 30 | 40 | 40 | 40 |
| | Calcium Carbonate ACTIFORT 701 | 5 | 5 | 5 | 5 | 5 | | | | | | 5 | 5 |
| Hollow Particles | EM403 | 2.7 | 2.7 | 2.7 | 2.7 | 2.7 | 2.6 | 2.9 | 2.8 | 2.7 | 2.9 | 2.7 | 2.7 |
| Foaming Agent | Cell-Mike CE | | | | | | | | 7.30 | | | | |

TABLE 2-continued

| Material | | Example | | | | | Comparative Example | | | | | | |
|---|---|---|---|---|---|---|---|---|---|---|---|---|---|
| Type | Material Name | 12 | 13 | 14 | 15 | 16 | 1 | 2 | 3 | 4 | 5 | 6 | 7 |
| Vulcanization Aid | Stearic Acid | 0.5 | 0.5 | 0.5 | 0.5 | 0.5 | 0.5 | 0.5 | 0.5 | 0.5 | 0.5 | 0.5 | 0.5 |
| | Zinc Oxide Group 3 | 5.0 | 5.0 | 5.0 | 5.0 | 5.0 | 5.0 | 5.0 | 5.0 | 5.0 | 5.0 | 5.0 | 5.0 |
| Vulcanizing Agent | PEROXYMON F40 | 8.0 | 8.0 | 8.0 | 8.0 | 8.0 | 8.0 | 8.0 | 8.0 | 8.0 | 8.0 | 8.0 | 8.0 |
| Co-Crosslinking Agent | Hi-Cross M/TMP ACTOR ZMA/Zinc Methacrylate | 2.0 | 2.0 | 2.0 | 2.0 | 2.0 | 2.0 | 2.0 | 2.0 20.0 | 2.0 20.0 | 2.0 | 2.0 | 2.0 |
| | Total PHR | 285.2 | 285.2 | 225.2 | 215.2 | 205.2 | 247.4 | 270.4 | 290.3 | 260.2 | 280.4 | 230.2 | 285.2 |
| | Total Amount of Hydrophilic Inorganic Filler | 85 | 85 | 55 | 45 | 35 | 30 | 30 | 30 | 0 | 40 | 85 | 85 |
| | Official Regain of Sliding-Resistant Material (%) JISL-0105 | 0 | 0 | 0 | 0 | 0 | 0 | 0 | 0 | 0 | 5.0 | 4.5 | 4.5 |
| | Abnormal Noise in Wet Condition with Rotation Variation Tension when Abnormal Noise is Generated (N/6ribs) | None | None | None | 270N (A Moment) | 440N (A Moment) | 1120N | 870N | 670N | 1330N | 660N | 1020N | 1270N |

(Test Evaluation Method)

Figure 17:
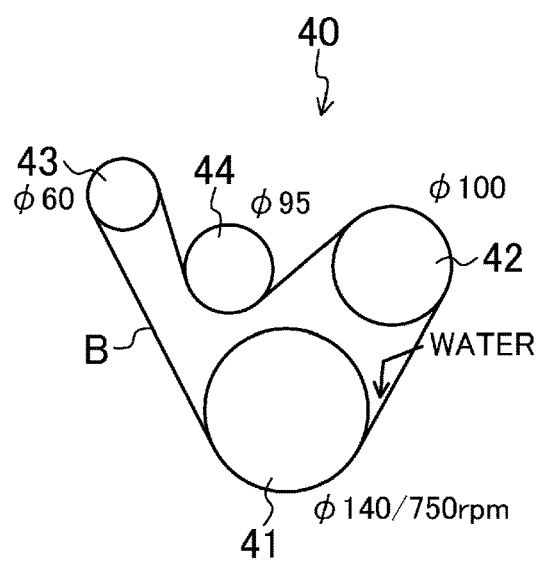
FIG. 17 illustrates a layout of pulleys of a belt running tester.

FIG. 17 illustrates a layout of pulleys of a belt running tester 40.

The belt running tester 40 includes: a zinc plated drive pulley 41, which is a ribbed pulley, having a diameter of 140 mm and provided at a lowermost position; a first driven pulley 42 (an air conditioning pulley), which is a ribbed pulley, having a diameter of 100 mm and provided at an upper right position of the drive pulley 41; and a second driven pulley 43 (an alternator pulley), which is a ribbed pulley, having a diameter of 60 mm and provided at an upper left position of the drive pulley 41 and the first driven pulley 42, and further includes an idler pulley 44, which is a flat pulley, having a diameter of 95 mm and provided on the left side of the first driven pulley 42. The belt running tester 40 is configured such that a V-ribbed belt B is wrapped around the respective pulleys so that the V-shaped ribs thereof come into contact with the drive pulley 41 and first and second driven pulleys 42 and 43, which are ribbed pulleys, and the backface thereof comes into contact with the idler pulley 44, which is a flat pulley.

In each of Examples 1 to 16 and Comparative Examples 1 to 7, the V-ribbed belt was tested on the belt running tester 40 for abnormal noise (whether abnormal noise was generated) when the belt was wet. For the tests, a V-ribbed belt to be tested was wrapped around the pulleys of the belt running tester 40, and the idler pulley 44 was positioned so that a predetermined tension was given to the V-ribbed belt. A load was provided to the first driven pulley 42 (1.5 MPa) and to the second driven pulley 43 (20 A). The drive pulley 41 was rotated at 750±120 rpm under an ambient temperature of 25° C. to run the belt. Then, 10 ml water was dropped onto a portion of the belt from where the belt was wrapped around the drive pulley 41 to check whether abnormal noise was generated from the belt having the given tension.

The tests were conducted with the belt tension ranging from 1300 N to 200 N. Note that the belt tension was adjusted with a change in the position of the idler pulley 44. Hence, it was difficult to adjust the belt tension precisely by the 100 N. Actual tests were conducted from over 1300 N to below 200 N. In other words, the tests were started with a tension over 1300 N. If no abnormal noise was generated, the position of the idler pulley 44 was adjusted to decrease the tension by approximately 100 N, and the presence or absence of the abnormal noise when water was provided to the belt was checked. The belt tension was sequentially decreased. When abnormal noise was generated, a tension at the moment of the noise was recorded (As described above, it was difficult to accurately set the tension. Hence, the tension was not set by the 100 N.)

(Test Results)

Tables 1 and 2 show the results. When a tension value alone is described, abnormal noise was generated when the belt tension was decreased to the tension value. The statement "A moment" described together with a value means that abnormal noise was generated only for a short period of time when the belt was run with the belt tension decreased to the value and after water was provided to the belt; however, when the belt was kept running, the abnormal noise disappeared after that. Moreover, the reference term "None" means that no abnormal noise was generated in a full range of belt tension from 1300 N to 200 N.

In Example 16, the polyethylene particles (i.e., hydrophobic resin particles) are used as a sliding-resistant material, and 35 parts by mass in total (30 parts by mass of silica and 5 parts by mass of calcium carbonate) of the hydrophilic inorganic filler is used. The abnormal noise in a wet condition is generated in a moment when the belt tension reaches 440 N. In Example 15 in which the content of silica is 10 parts by mass larger than that in Example 16, the abnormal noise in a wet condition is generated only for a moment when the belt tension reaches 270 N, which is smaller than in Example 16. The generated abnormal noise is less than that in Example 16. In Example 14 in which the content of silica is additionally 10 parts by mass larger than that in Example 15, no abnormal noise is generated in a full range of the belt tension from 1300 N to 200 N. The abnormal noise in a wet condition is sufficiently reduced.

In any of Examples 1 to 13, hydrophobic resin particles or resin fibers are used as a sliding-resistant material, and 65 parts by mass, 75 parts by mass, or 85 parts by mass of hydrophilic inorganic filler is used. In any of these Examples, no abnormal noise is generated in a full range of the belt tension from 1300 N to 200 N. The abnormal noise in a wet condition is sufficiently reduced.

Whereas, in Comparative Examples 1 to 7, the abnormal noise is generated longer than a moment until the belt tension is decreased to 200 N (from 660 N to 1330 N). In Comparative Examples 1 to 4, hydrophobic resin particles or resin fibers are contained; however, the content of the hydrophilic inorganic filler is 30 parts by mass or 0 parts by mass. In Comparative Examples 5 to 7, the content of hydrophilic inorganic filler is 40 parts by mass or 85 parts by mass; however, the contained resin particles or resin fibers are not hydrophobic (the official regain is 4.5% or 5%, which exceeds the reference official regain of the present disclosure; namely 0.4%).

The present disclosure is useful in the technical field of friction transmission belts.

What is claimed is:

1. A friction transmission belt comprising a rubber layer forming a pulley contact surface, wherein
   the rubber layer includes a rubber composition containing hydrophilic inorganic filler, and a sliding-resistant material,
   the hydrophilic inorganic filler includes at least silica not receiving coupling treatment,
   the sliding-resistant material protrudes from the pulley contact surface, and is hydrophobic resin particles having an official regain of 0.4% or below,
   in the rubber composition, a content of the sliding-resistant material with respect to 100 parts by mass of the rubber component is 35 parts by mass or more and 100 parts by mass or less, and
   in the rubber composition, a content of the hydrophilic inorganic filler with respect to 100 parts by mass of a rubber component is 35 parts by mass or more and 85 parts by mass or less.

2. The friction transmission belt of claim 1, wherein in the rubber composition, the content of the hydrophilic inorganic filler with respect to 100 parts by mass of the rubber component is 45 parts by mass or more and 85 parts by mass or less.

3. The friction transmission belt of claim 1, wherein in the rubber composition, the content of the hydrophilic inorganic filler with respect to 100 parts by mass of the rubber component is 55 parts by mass or more and 85 parts by mass or less.

4. The friction transmission belt of claim 1, wherein the sliding-resistant material is made of polyethylene or polyethylene terephthalate.

5. The friction transmission belt of claim 1, wherein the hydrophilic inorganic filler further comprises at least one of, montmorillonite, clay, and calcium carbonate.

6. The friction transmission belt of claim 1, wherein in the rubber composition, a content of the silica with respect to 100 parts by mass of the rubber component is 30 parts by mass or more and 85 parts by mass or less.

7. The friction transmission belt of claim 1, wherein the rubber composition does not contain a coupling agent.

8. The friction transmission belt of claim 1, wherein the hydrophilic inorganic filler further comprises at least Ca-montmorillonite.

* * * * *